(12) United States Patent
Iyer

(10) Patent No.: US 6,444,337 B1
(45) Date of Patent: Sep. 3, 2002

(54) FUEL CELL WITH LOW CATHODIC POLARIZATION AND HIGH POWER DENSITY

(75) Inventor: Subramanian T. M. Iyer, Brea, CA (US)

(73) Assignee: Energetics, Inc., Brea, CA (US)

( * ) Notice: Subject to any disclaimer, the term of this patent is extended or adjusted under 35 U.S.C. 154(b) by 0 days.

(21) Appl. No.: 09/961,116

(22) Filed: Sep. 20, 2001

Related U.S. Application Data

(60) Provisional application No. 60/235,345, filed on Sep. 26, 2000.

(51) Int. Cl.[7] .................................................. H01M 8/04
(52) U.S. Cl. ........................... 429/17; 429/13; 429/19; 429/21
(58) Field of Search ............................... 429/13, 17, 19, 429/21

(56) References Cited

U.S. PATENT DOCUMENTS

| | | |
|---|---|---|
| 4,048,384 A | 9/1977 | Chillier-Duchatel et al. .. 429/22 |
| 4,068,042 A | 1/1978 | Chillier-Duchatel et al. |
| 4,150,204 A | 4/1979 | Moden et al. |
| 4,218,518 A | 8/1980 | Vaseen |
| 4,578,323 A | 3/1986 | Hertl et al. |
| 5,187,025 A | 2/1993 | Kelland et al. |
| 5,441,819 A * | 8/1995 | Voss et al. ..................... 429/13 |
| 5,534,363 A | 7/1996 | Sprouse et al. |
| 5,563,003 A | 10/1996 | Suzuki et al. |
| 5,599,638 A | 2/1997 | Surampudi et al. |
| 5,609,974 A | 3/1997 | Sun |
| 5,798,187 A | 8/1998 | Wilson et al. |
| 6,037,072 A | 3/2000 | Wilson et al. |

FOREIGN PATENT DOCUMENTS

| | | |
|---|---|---|
| EP | 0511719 B1 | 9/1985 |
| EP | 0283751 A3 | 2/1988 |
| EP | 0283751 A2 | 2/1988 |
| EP | 0342110 B1 | 5/1989 |
| JP | 56127384 | 10/1981 |
| WO | WO7900030 | 3/1978 |

OTHER PUBLICATIONS

Article from Purdue News entitled "Hydrogen Peroxide Could Power Future Fuel Cell", dated Jan. 2000.

* cited by examiner

Primary Examiner—Laura Weiner
(74) Attorney, Agent, or Firm—Sheldon & Mak; Denton L. Anderson

(57) ABSTRACT

A method of generating electricity from a fuel cell comprises the steps of (i) providing a fuel, such as molecular hydrogen, to an anode electrocatalyst, (ii) providing an oxygen-containing liquid to a cathode electrocatalyst, (iii) converting the fuel to positive ions via the anode electrocatalyst and the anode, while simultaneously converting the oxygen-containing liquid to yield hydroxyl or oxygen ions via the cathode electrocatalyst and the cathode, and (iv) continuously or periodically reoxidizing the oxygen-containing liquid by contacting the oxygen-containing liquid with molecular oxygen. In the method, at least about 90% of the oxygen provided to the cathode is provided by the oxygen-containing liquid.

25 Claims, 2 Drawing Sheets

FUEL CELL WITH LOW CATHODIC POLARIZATION AND HIGH POWER DENSITY

This application claims benefit of provisional application Ser. No. 60/235,345 filed Sep. 26, 2000.

FIELD OF THE INVENTION

This invention relates generally to fuel cells and, more specifically, to fuel-oxygen fuel cells.

BACKGROUND OF THE INVENTION

Fuel cells are taking on increased importance for the production of electrical energy. The simple design of a fuel cell allows for electrical production from a wide variety of sizes and capacities. Moreover, many fuel cells, such as hydrogen-oxygen fuel cells, produce electrical power with virtually no anti-environmental side effects.

The major problem in the use of fuel cells has been the relatively low efficiencies achieved by fuel cells of the prior art. In a hydrogen-oxygen fuel cell, such inefficiencies arise principally from the non-ideal behavior of chemical reactions at the oxygen electrode. In a hydrogen-oxygen fuel cell under standard conditions, the theoretical reversible open circuit voltage in both acidic and alkaline media is 1.23 volts. Hydrogen behaves nearly ideally at the hydrogen electrode. However, oxygen does not behave ideally at the oxygen electrode. Because the oxygen electrode does not behave ideally, the experimental open circuit voltage of a typical hydrogen-oxygen fuel cell of the prior art ranges from about 0.98 volts to about 1.10 volts.

Hydrogen-oxygen fuel cells of the prior art almost exclusively operate on molecular hydrogen and molecular oxygen. The non-ideal behavior at the oxygen electrode is essentially due to the activation energy required to break down the molecular oxygen double bond for absorption onto the electrocatalyst. The double bond of an oxygen molecule has great stability. Over the entire pH range, the rest potential of the oxygen electrode is very slowly established. Values of more than 100 mV less than the theoretical oxygen potential are commonly measured. Various intermediate radicals are formed after the oxygen bond is broken, further complicating the course of reaction. The kinetics of oxygen reduction on electrocatalysts is controlled by the rate of charge transfer involving absorption of molecular oxygen, and is inhibited by these intermediaries. A low exchange current density for oxygen reduction is also observed, resulting in high activation polarization and further non-ideal behavior.

Various electrocatalysts have been investigated, but none have been able to bring the open circuit voltage close to the ideal value of 1.23 volts. This is unfortunate because if the open circuit voltage could be brought close to the ideal value of 1.23 volts, the energy conversion efficiency of present hydrogen-oxygen fuel cells would be increased by almost 20%.

Accordingly, there is a need for a fuel-oxygen fuel cell, such as a hydrogen-oxygen fuel cell, which avoids the aforementioned problems in the prior art.

SUMMARY

The invention satisfies this need. The invention is a method of generating electricity from a fuel cell. The method employs a fuel cell having the following elements: (i) an anode, (ii) a cathode, (iii) an anode electrocatalyst disposed in electrical contact with the anode, the electrocatalyst being capable of catalyzing a fuel to positive ions, (iv) a cathode electrocatalyst disposed in electrical contact with the cathode, the cathode electrocatalyst being capable of catalyzing oxygen contained in an oxygen containing liquid to oxygen ions or hydroxyl ions, (v) a fuel inlet port for introducing the fuel to the anode, and (vi) an electrolyte electronically separating the anode from the cathode.

The method comprises the steps of (a) providing the fuel cell described in the previous paragraph, (b) providing a fuel to the anode electrocatalyst via the fuel inlet port, (c) providing an oxygen containing liquid to the cathode electrocatalyst, (d) converting the fuel to positive ions via the anode electrocatalyst and the anode, while simultaneously converting the oxygen containing liquid to yield hydroxyl or oxygen ions a the cathode electrocatalyst and the cathode, whereby an electrical potential is created between the anode and the cathode, and (e) reoxidizing the oxygen containing liquid by contacting the oxygen containing liquid with molecular oxygen. In the method, at least about 90% of the oxygen provided at the cathode is provided by the oxygen-containing liquid.

DRAWINGS

These features, aspects and advantages of the present invention will become better understood with regard to the following description, appended claims and accompanying figures where:

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

Figure 1:
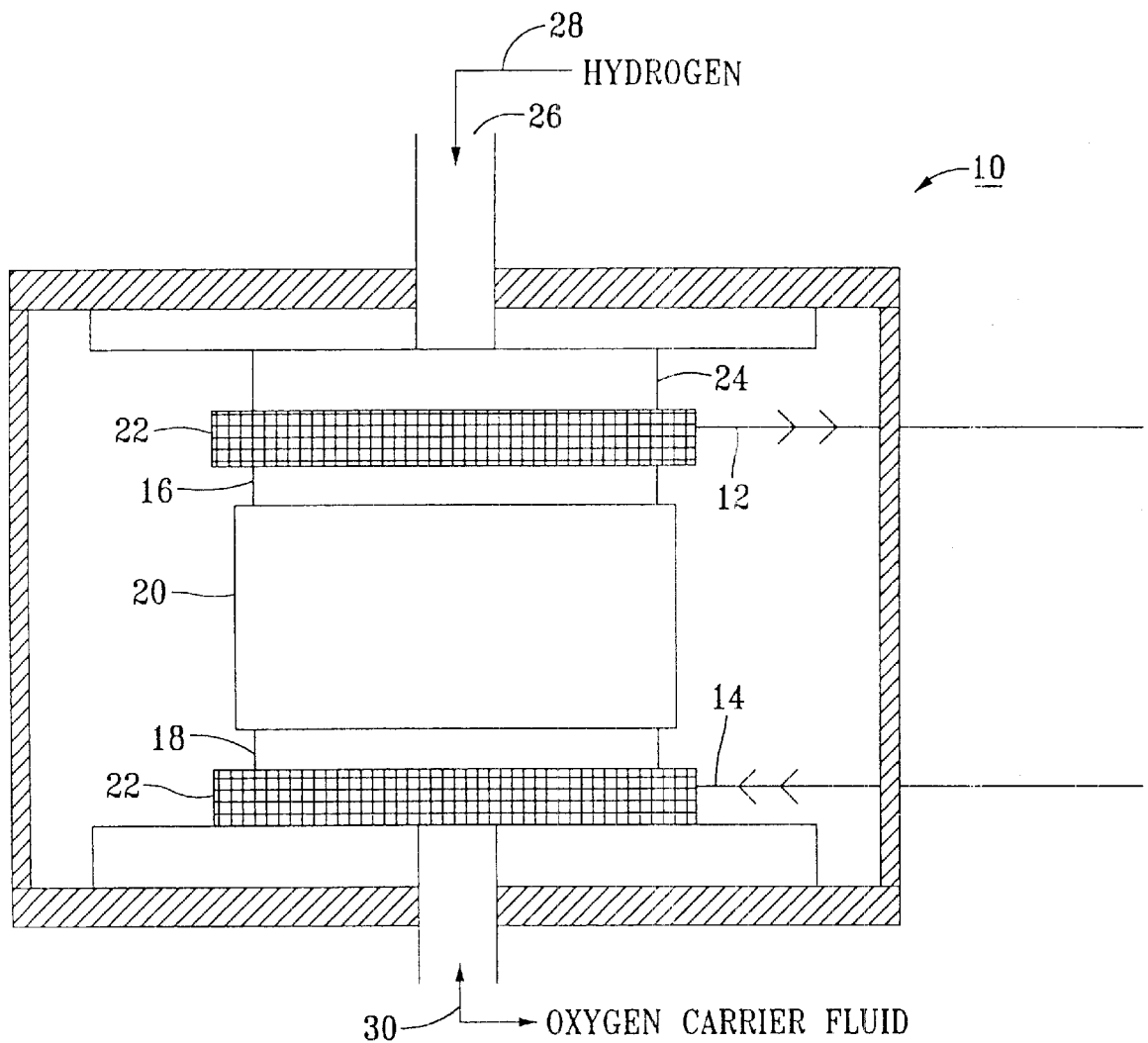
FIG. 1 is a diagrammatic view of a fuel cell having features of the invention.

The invention is a novel method of generating electricity from a fuel cell. The method employs a fuel cell 10 as illustrated in FIG. 1. The fuel cell 10 has an anode 12, a cathode 14, an anode electrocatalyst 16, a cathode electrocatalyst 18 and an electrolyte 20.

The anode 12 can be any of the many conventional anodes known in the art capable of converting a fuel to positive ions. The anode 12 can be, for example, an E-tek Type ECC/ELAT platinized carbon cloth.

The cathode 14 can be any of the many conventional cathodes known in the art capable of accepting electrodes from hydroxyl or oxygen ions. Like the anode 12, the cathode 14 can be, for example, an E-tek Type ECC/ELAT platinized carbon cloth.

The anode electrocatalyst 16 can be any of the many anode electrocatalysts known in the prior art capable of catalyzing the fuel molecules to positive ions. Where the fuel is molecular hydrogen, the anode electrocatalyst 16 is typically platinum-based or nickel-based catalyst.

The cathode electrocatalysts 18 can be any of the many cathode electrocatalysts known in the art. Typically, the cathode electrocatalyst 18 is a platinum-based, nickel-based or silver based catalyst.

Both the anode electrocatalyst 16 and the cathode electrocatalyst 18 are typically dispersed in carbon paper. Alternatively, sponge-based catalysts can be used. Typically, however, sponge-based catalysts are somewhat less efficient than catalysts dispersed in carbon paper.

The electrolyte 20 is disposed within the fuel cell 10 such that the electrolyte 20 electronically separates the anode 12 from the cathode 14. In a typical embodiment, the electrolyte 20 comprises a matrix containing a liquid electrolyte or a solid polymer electrolyte.

Typical liquid acid electrolytes are sulphuric acid and nitric acid. Liquid basic electrolytes useable in the method are potassium hydroxide and sodium hydroxide. In one embodiment, the oxygen-carrying liquid can also act as the electrolyte.

The matrix can be an absorbent glass mat or a glass wool. Alternatively, the matrix can be an absorbent cellulosic, vinyon, rayon, nylon, polyolefms or similar organic fiber meat. The matrix is typically used to structurally support the electrodes, separate the electrodes for electron insulation, allow ionic conductance and retain the electrolyte.

Solid polymer electrolytes useable in the invention are sulfonic acid-based fluoropolymers (acid type) or quaternary ammonium (alkaline) electrolytes and ionexchange resins (anionic).

The fuel cell 10 typically further comprises current collectors 22 disposed at both the anode 12 and the cathode 14. The current collectors 22 are wetted by an oxygen-containing liquid (described below). Typically, the current collectors 22 comprise a metal screen made from stainless steel, copper or titanium-based alloys.

Where the fuel to the fuel cell 10 is molecular hydrogen, the fuel cell 10 also typically further comprises a graphite diffusion layer 24 disposed between a fuel inlet port 26 and the anode 12. The graphite diffusion layer 24 is a high-density, low porosity graphite with a specific gravity of between about 1.7 and about 1.8.

In the method, fuel 28, such as molecular hydrogen, is provided to the anode electrocatalyst 16 via the fuel inlet port 26. Many other fuels can be used besides molecular hydrogen. For example, methanol, ethanol, ammonia and amines can also be used. At the anode electrocatalyst 16 and the anode 12, the fuel 28 is converted to positive ions.

While fuel 28 is provided to the anode electrocatalyst 16, an oxygen-containing liquid 30 is provided to the cathode electrocatalyst 18. At the cathode electrocatalyst 18 and the cathode 14, the oxygen-containing liquid 30 is caused to yield hydroxyl or oxygen ions. The combined reactions at the anode electrocatalyst 16 and at the cathode electrocatalyst 18 create an electrical potential between the anode 12 and the cathode 14.

In the method of the invention, at least about 90% of the oxygen provided to the cathode 14 is provided by the oxygen-containing liquid 30.

The oxygen-containing liquid 30 is one capable of carrying oxygen to the cathode electrocatalyst and the cathode and releasing that oxygen with minimum polarization losses. Also, the oxygen-containing liquid 30 must be capable of being readily reoxygenated by the simple and inexpensive step of being contacted with molecular oxygen. The absorption/desorption of the oxygen should be without the necessity of high pressures, expensive catalysts, high energy consumption requirements and expensive apparatuses. The oxygen-containing liquid should also be temperature stable between about 150° C. and about 250° C. without losing its ability to transport oxygen.

The oxygen-containing liquid 30 can be an aqueous solution containing an inorganic salt. Alternatively, the oxygen-containing liquid 30 can be an organic liquid. inorganic salts useable in the oxygen-containing liquid 30 include amphoteric oxides and their hydroxides, oxidizing salts and chelating agents. Examples of amphoteric oxides useable in the invention include chromic oxide, manganese dioxide, stannic oxide, plumbic oxide and zinc oxide. Examples of hydroxides useable in the invention include those of titanium, nickel, cobalt and silver. Examples of oxidizing salts useable in the invention include permanganates, dichromates, manganates and chromates.

Examples of chelating agents useable in the invention include polydentate ligands, such as oxalates, carbonates and ethylenediamines. Examples of transition metals macrocyclics useable in the invention include nickel, iron, copper, zinc, cobalt and titanium complexes, such as porphyrins.

Organic liquids useable as the oxygen-containing liquid 30 include silicones, fluorocarbons, perfluorocarbons, quinones and transition metal macrocyclics. Examples of suitable perfluorocarbons include perfluoroctyl bromide, perfluorodecalin and perfluorodicholoctane. An advantage of perfluorochemicals is the fact that they are synthetic organics that can be chemically produced in large amounts. Oxygen-absorbing perfluoromolecules can also have a significant advantage in fuel cell performance due to their high stability in a wide range of pH, temperatures and pressures. Oxygen-containing capacity is essentially dependent on the concentration of the perfluorochemicals. These molecules have been found to selectively transport both oxygen and carbon dioxide. The significant of this finding to fuel cell research, especially when using hydrocarbons as the source of fuel, is evident to practitioners skilled in the art.

Quinone compounds have also been found to be suitable oxygen-containing liquids useable in the invention, especially sulfoanthraquinones, anthraquinones or benzoquinones. Quinones are used in organic synthesis as mildly oxidizing agents. In their excited states, quinone compounds are capable of stripping electrons from a fuel donor and in turn being oxidized to their ground states by releasing the extra electrons to the electrode. In cases where a quinone compound in its ground state has a higher affinity for electrons than certain fuels, such as polyhydroxyclic compounds (e.g., reducing sugars), the quinone compound can strip electrons from these fuels. Once reduced, the quinone compound is reoxidized by releasing electrons to the electrode. Such phenomenon is explained in detail in U.S. Pat. No. 4,578,323, the contents of which are incorporated herein by this reference.

The oxygen-containing liquid 30 must be continuously or periodically reoxygenated. The oxygen-containing liquid 30 can be reoxygenated in situ whereby molecular oxygen is bubbled into the chamber within the fuel cell containing the oxygen-containing liquid. More typically, however, the oxygen-containing liquid 30 is removed from the fuel cell 10 and reoxygenated in separate equipment. Typically, such separate equipment includes a contacting column capable of contacting the oxygen-containing liquid 30 with tiny bubbles of oxygen at a temperature between about 80° C. and about 95° C. Preferably, the oxygen-containing liquid 30 is contacted with molecular oxygen from which carbon dioxide has been removed.

EXAMPLE

The experimental fuel cell was constructed as described in the above-mentioned paragraphs. Stainless screens were used as the current collectors and flow fields. Electrocatalysts used were commercially available platinized carbon cloth, wetproofed on the anodic section by means of a hydrophobic fluorocarbon/carbon layer. In one embodiment of the invention, potassium manganate solution was used as the oxygen carrier fluid, as well as the electrolyte. The relevant anodic and cathodic reactions are as follows:
Anode:

$$H_2 + 2OH^- \leftrightarrows 2H_2O + 2e \quad E° = 0.830 \text{ V}$$

Cathohde:

$$MnO_4^- + 2H_2O + 2e \rightarrow MnO_2 + 4OH^- \quad E° = 0.603 \text{ V}$$

The total electrochemical reaction in the fuel cell is as follows:

$$H_2 + MnO_4^- \leftrightarrows MnO_2 + 2OH^- \quad E° = 1.433 \text{ V}$$

A positive value for the standard reversible potential shows a spontaneous reaction in the forward direction.

The equilibrium constant K for the reaction can be calculated as follows:

$$K = [MnO_2]\downarrow[OH]^2/[MnO_4^-]pH_2$$

i.e. $K = [OH^-]_2/[MnO_4^-]pH_2$

The magnanese dioxide precipitates out in the reaction, and hence is not considered in the computation of the equilibrium constant. Using the Nernst equation, the equilibrium constant computes to $3.12 \times 10_{48}$. A large number for K shows a spontaneous reaction in the forward direction.

Shown as a chemical reaction, the fuel cell reaction translates to the following:

$$H_2 + K_2MnO_4 \leftrightarrows MnO_2 + 2KOH$$

The reaction products are treated with oxygen, or air, outside the fuel cell chamber to replenish the potassium manganate solution, preferably at temperatures between about 85° C. and 95° C., as per the reaction:

$$2MnO_2 + 4KOH + O_2 \leftrightarrows 2K_2MnO_4 + 2H_2O$$

The overall chemical reaction of the complete fuel cell system is as follows:

$$2H_2 + O_2 \leftrightarrows 2H_2O$$

The essential advantage of the proposed reaction mechanism is the fact that in the electrochemical system, a higher standard potential is achievable, as compared to conventional fuel cells of the prior art. The standard potential for conventional fuel cells using hydrogen and oxygen to form water is 1.23 V. The standard potential for the manganate fuel cell is 1.433 V. Water is formed outside the electrochemical cell, and will entail blowing oxygen, or air, into the depleted reaction products to replenish the reactants.

Figures 2, 3:
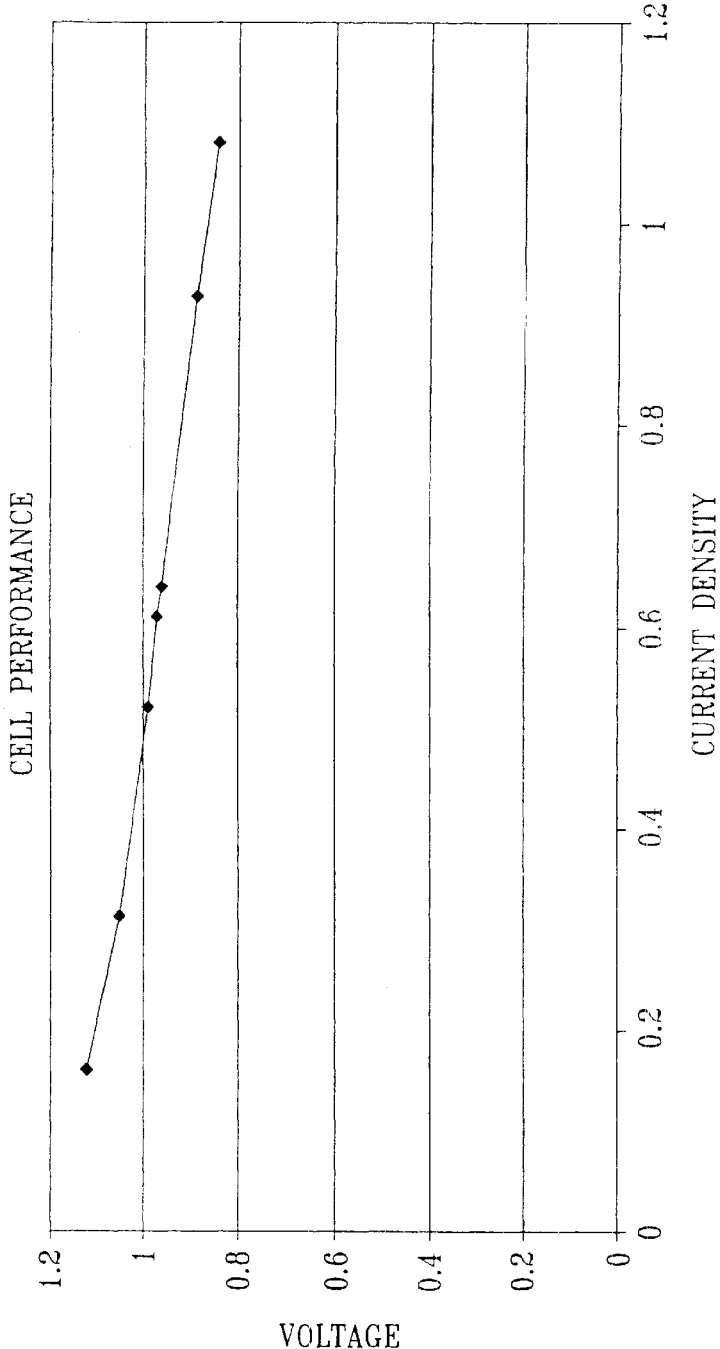
FIG. 2 is a graph illustrating the experimental results from one example of the invention.
FIG. 3 is a table illustrating the experimental results from one example of the invention.

The experimental fuel cell was fabricated and tested as described in the paragraphs above. Results of the testing is illustrated in FIGS. 2 and 3. Open circuit voltage measurements on the experimental fuel cell were in the range of 1.39–1.42 volts, as compared to the thermodynamic standard equilibrium potential of 1.433 V. The small deviation from ideality is postulated to be due to internal cell resistance loss, as well as very small activation polarization effects. In comparison, in conventional fuel cells, open circuit voltages approximate 0.9 V, showing substantial deviation from the standard equilibrium voltage of 1.23 V.

The experimental fuel cell thus exhibits an improvement in efficiency of 40–45% over fuel cells of prior art, by reducing the activation polarization losses inherent in conventional fuel cells.

Practitioners skilled in the art will recognize the anodic reaction of the experimental fuel cell to be similar to the anodic reaction in the alkaline fuel cell, with attendant desirable attributes of excellent performance of the electrodes over a wide range of electrocatalysts. The cathodic reaction of the experimental fuel cell is an equally facile reaction, allowing great flexibility with a wide range of electrocatalysts. The electrode reaction kinetics for oxygen reduction in alkaline electrolytes is much better than in acid electrolytes, carbonate electrolytes or solid oxides. The experimental fuel cell is a substantial improvement over alkaline electrolytes due to the use of the oxygen carrier fluid, which utilizes the manganate ion to allow hydroxide ion replenishment, with minimal activation energy barriers.

Concentration polarization effects in the experimental fuel cell were lower, when compared to fuel cells of the prior art. The recirculating loop of the oxygen carrier fluid allows good mass transfer coefficients. In one embodiment of the preferred invention, as discussed above, one of the reaction products is manganese dioxide, which precipitates out. Thus, it does not enter into considerations of the reaction equilibrium constant, allowing the forward cathodic reaction to proceed with greater kinetics. This, coupled with recirculating the fluid, allows lower concentration polarization effects. Electrical measurements exhibited a power density of 1 watt per square centimeter of electrode area. Hydrogen pressures were maintained at 15 psi (1 atm). Higher pressures will result in an attendant increase in power density. All testing was conducted at room temperature.

Blowing both oxygen and air into the depleted fluid, in separate experiments, tested regeneration of the oxygen carrier fluid. Pressures used were 15 psi. The air was scrubbed of any carbon dioxide present in it by blowing it through concentrated potassium hydroxide solution. The regeneration was found to be complete, as evidenced by the absence of any precipitate of manganese dioxide. Ambient room temperature was used. The reaction kinetics is favored by higher temperatures, approximately 80–95° F. It is assumed that there will be some power consumption in blowing air into the depleted oxygen carrier fluid for replenishment, but the improvement in open circuit voltage and polarization effects are postulated to make up for this minor power loss. In one embodiment of the preferred invention, porous stainless steel tubes, made by powder metallurgical processes, were used as diffusers, enhancing the replenishment of the oxygen carrier fluid.

The invention has been found to provide a. fuel cell having a high current density, high power density and low oxygen electrode polarization. Water management problems in the fuel cell of the invention are at a minimum. The invention also provides a fuel cell which is relatively less expensive to build and maintain due to its use of inexpensive materials and non-noble catalysts.

Although the description above contains many specifications, these should not be construed as limiting the scope of the invention but as merely providing illustrations of some of the presently preferred embodiments of this invention.

What is claimed is:

1. A method of generating electricity from a fuel cell comprising the steps of:
   (a) providing a fuel cell having the following elements:
      (i) an anode;

(ii) a cathode;
(iii) an anode electrocatalyst disposed in electrical contact with the anode, the electrocatalyst being capable of catalyzing hydrogen molecules to hydrogen ions;
(iv) a cathode electrocatalyst disposed in electrical contact with the cathode, the cathode electrocatalyst being capable of catalyzing oxygen contained in an oxygen containing liquid to oxygen ions or hydroxyl ions;
(v) a fuel inlet port for introducing hydrogen to the hydrogen anode; and
(vi) an electrolyte electronically separating the anode from the cathode;
(b) providing a fuel to the anode electrocatalyst via the fuel inlet port;
(c) providing an oxygen containing liquid to the cathode electrocatalyst, the oxygen containing liquid being an aqueous solution containing an inorganic salt;
(d) converting the fuel to positive ions via the anode electrocatalyst and the anode, while simultaneously converting the oxygen containing liquid to yield hydroxyl or oxygen ions via the cathode electrocatalyst and the cathode, whereby an electrical potential is created between the anode and the cathode; and
(e) reoxygenating the oxygen containing liquid by contacting the oxygen containing liquid with molecular oxygen;
wherein, at least about 90% of the oxygen provided to the cathode is provided by the oxygen containing liquid.

2. The method of claim 1 wherein the fuel is molecular hydrogen.

3. The method of claim 1 wherein the inorganic salt is chosen from the group of inorganic salts consisting of amphoteric salts, hydroxides and oxides, oxidizing salts and chelating agents.

4. The method of claim 1 wherein the inorganic salt comprises manganate ions.

5. The method of claim 1 wherein the inorganic salt comprises chromate ions.

6. The method of claim 1 wherein the electrolyte comprises a matrix containing a liquid electrolyte or a solid polymer electrolyte.

7. The method of claim 6 wherein the matrix is an absorbent glass mat.

8. The method of claim 6 wherein the matrix is an organic fiber mat.

9. The method of claim 1 wherein the fuel cell further comprises current collectors disposed at both the anode and the cathode.

10. The method of claim 9 wherein the current collectors comprise a metal screen.

11. The method of claim 1 wherein the fuel cell further comprises a graphite diffusion layer disposed between the hydrogen inlet port and the anode.

12. The method of claim 1 wherein the anode electrocatalyst is an electrocatalyst dispersed in carbon paper.

13. The method of claim 1 wherein the cathode electrocatalyst is an electrocatalyst dispersed in carbon paper.

14. The method of claim 1 wherein the reoxygenating of the oxygen containing liquid comprises the step of bubbling air through the oxygen containing liquid.

15. The method of claim 14 wherein the step of bubbling air through the oxygen containing liquid is preceded by the step of removing carbon dioxide from the air which is to be bubbled through the oxygen containing liquid.

16. A fuel cell comprising:
(a) an anode;
(b) a cathode;
(c) an anode electrocatalyst disposed in electrical contact with the anode, the electrocatalyst being capable of catalyzing hydrogen molecules to hydrogen ions;
(d) a cathode electrocatalyst disposed in electrical contact with the cathode, the cathode electrocatalyst being capable of catalyzing oxygen contained in an oxygen containing liquid to oxygen ions or hydroxyl ions;
(e) a fuel inlet port for introducing hydrogen to the hydrogen anode;
(f) an electrolyte electronically separating the anode from the cathode; and
(g) an oxygen containing liquid disposed in contact with the cathode and the cathode electrocatalyst, the oxygen containing liquid being an aqueous solution containing an inorganic salt of the type which is readily reoxygenated by contact with molecular oxygen.

17. A method of generating electricity from a fuel cell comprising the steps of:
(a) providing a fuel cell having the following elements:
(i) an anode;
(ii) a cathode;
(iii) an anode electrocatalyst disposed in electrical contact with the anode, the electrocatalyst being capable of catalyzing hydrogen molecules to hydrogen ions;
(iv) a cathode electrocatalyst disposed in electrical contact with the cathode, the cathode electrocatalyst being capable of catalyzing oxygen contained in an oxygen containing liquid to oxygen ions or hydroxyl ions;
(v) a fuel inlet port for introducing hydrogen to the hydrogen anode; and
(vi) an electrolyte electronically separating the anode from the cathode;
(b) providing a fuel to the anode electrocatalyst via the fuel inlet port;
(c) providing an oxygen containing liquid to the cathode electrocatalyst, the oxygen containing liquid being an organic liquid chosen from the group of organic liquids consisting of silicones, fluorocarbons, perfluorochemicals, quinones and microcyclics;
(d) converting the fuel to positive ions via the anode electrocatalyst and the anode, while simultaneously converting the oxygen containing liquid to yield hydroxyl or oxygen ions via the cathode electrocatalyst and the cathode, whereby an electrical potential is created between the anode and the cathode; and
(e) reoxygenating the oxygen containing liquid by contacting the oxygen containing liquid with molecular oxygen;
wherein, at least about 90% of the oxygen provided to the cathode is provided by the oxygen containing liquid.

18. A method of generating electricity from a fuel cell comprising the steps of:
(a) providing a fuel cell having the following elements:
(i) an anode;
(ii) a cathode;
(iii) an anode electrocatalyst disposed in electrical contact with the anode, the electrocatalyst being capable of catalyzing hydrogen molecules to hydrogen ions;
(iv) a cathode electrocatalyst disposed in electrical contact with the cathode, the cathode electrocatalyst being capable of catalyzing oxygen contained in an oxygen containing liquid to oxygen ions or hydroxyl ions;

(v) a fuel inlet port for introducing hydrogen to the hydrogen anode; and (vi) an electrolyte electronically separating the anode from the cathode, the electrolyte comprising a matrix containing a liquid electrolyte or solid polymer electrolyte, the matrix being an absorbent glass mat;

(b) providing a fuel to the anode electrocatalyst via the fuel inlet port;

(c) providing an oxygen containing liquid to the cathode electrocatalyst;

(d) converting the fuel to positive ions via the anode electrocatalyst and the anode, while simultaneously converting the oxygen containing liquid to yield hydroxyl or oxygen ions via the cathode electrocatalyst and the cathode, whereby an electrical potential is created between the anode and the cathode; and (e) reoxygenating the oxygen containing liquid by contacting the oxygen containing liquid with molecular oxygen;

wherein, at least about 90% of the oxygen provided to the cathode is provided by the oxygen containing liquid.

19. A method of generating electricity from a fuel cell comprising the steps of:

(a) providing a fuel cell having the following elements:
(i) an anode;
(ii) a cathode;
(iii) an anode electrocatalyst disposed in electrical contact with the anode, the electrocatalyst being capable of catalyzing hydrogen molecules to hydrogen ions;
(iv) a cathode electrocatalyst disposed in electrical contact with the cathode, the cathode electrocatalyst being capable of catalyzing oxygen contained in an oxygen containing liquid to oxygen ions or hydroxyl ions;
(v) a fuel inlet port for introducing hydrogen to the hydrogen anode; and
(vi) wherein the electrolyte comprises a matrix containing a liquid electrolyte or a solid polymer electrolyte, the matrix being an organic fiber mat;

(b) providing a fuel to the anode electrocatalyst via the fuel inlet port;

(c) providing an oxygen containing liquid to the cathode electrocatalyst;

(d) converting the fuel to positive ions via the anode electrocatalyst and the anode, while simultaneously converting the oxygen containing liquid to yield hydroxyl or oxygen ions via the cathode electrocatalyst and the cathode, whereby an electrical potential is created between the anode and the cathode; and (e) reoxygenating the oxygen containing liquid by contacting the oxygen containing liquid with molecular oxygen;

wherein, at least about 90% of the oxygen provided to the cathode is provided by the oxygen containing liquid.

20. A method of generating electricity from a fuel cell comprising the steps of:

(a) providing a fuel cell having the following elements:
(i) an anode;
(ii) a cathode;
(iii) an anode electrocatalyst disposed in electrical contact with the anode, the electrocatalyst being capable of catalyzing hydrogen molecules to hydrogen ions;
(iv) a cathode electrocatalyst disposed in electrical contact with the cathode, the cathode electrocatalyst being capable of catalyzing oxygen contained in an oxygen containing liquid to oxygen ions or hydroxyl ions;
(v) a fuel inlet port for introducing hydrogen to the hydrogen anode; and
(vi) an electrolyte electronically separating the anode from the cathode;

(b) providing a fuel to the anode electrocatalyst via the fuel inlet port;

(c) providing an oxygen containing liquid to the cathode electrocatalyst;

(d) converting the fuel to positive ions via the anode electrocatalyst and the anode, while simultaneously converting the oxygen containing liquid to yield hydroxyl or oxygen ions via the cathode electrocatalyst and the cathode, whereby an electrical potential is created between the anode and the cathode; and (e) reoxygenating the oxygen containing liquid by bubbling air through the oxygen containing liquid;

wherein, at least about 90% of the oxygen provided to the cathode is provided by the oxygen containing liquid.

21. The method of claim 20 wherein the step of bubbling air through the oxygen containing liquid is preceded by the step of removing carbon dioxide from the air which is to be bubbled through the oxygen containing liquid.

22. A fuel cell comprising:

(a) an anode;

(b) a cathode;

(c) an anode electrocatalyst disposed in electrical contact with the anode, the electrocatalyst being capable of catalyzing hydrogen molecules to hydrogen ions;

(d) a cathode electrocatalyst disposed in electrical contact with the cathode, the cathode electrocatalyst being capable of catalyzing oxygen contained in an oxygen containing liquid to oxygen ions or hydroxyl ions;

(e) a fuel inlet port for introducing hydrogen to the hydrogen anode;

(f) an electrolyte electronically separating the anode from the cathode; and (g) an oxygen containing liquid disposed in contact with the cathode and the cathode electrocatalyst, the oxygen containing liquid being an organic liquid chosen from the group of organic liquids consisting of silicones, fluorocarbons, perfluorochemicals, quinones and microcyclics.

23. A fuel cell comprising:

(a) an anode;

(b) a cathode;

(c) an anode electrocatalyst disposed in electrical contact with the anode, the electrocatalyst being capable of catalyzing hydrogen molecules to hydrogen ions;

(d) a cathode electrocatalyst disposed in electrical contact with the cathode, the cathode electrocatalyst being capable of catalyzing oxygen contained in an oxygen containing liquid to oxygen ions or hydroxyl ions;

(e) a fuel inlet port for introducing hydrogen to the hydrogen anode;

(f) an electrolyte electronically separating the anode from the cathode, the electrolyte comprising a matrix containing a liquid electrolyte or a solid polymer electrolyte, the matrix being an absorbent glass met; and (g) an oxygen containing liquid disposed in contact with the cathode and the cathode electrocatalyst, the oxygen containing liquid being of the type which is readily reoxygenated by contact with molecular oxygen.

24. A fuel cell comprising:
(a) an anode;
(b) a cathode;
(c) an anode electrocatalyst disposed in electrical contact with the anode, the electrocatalyst being capable of catalyzing hydrogen molecules to hydrogen ions;
(d) a cathode electrocatalyst disposed in electrical contact with the cathode, the cathode electrocatalyst being capable of catalyzing oxygen contained in an oxygen containing liquid to oxygen ions or hydroxyl ions;
(e) a fuel inlet port for introducing hydrogen to the hydrogen anode;
(f) an electrolyte electronically separating the anode from the cathode, wherein the electrolyte comprises a matrix containing a liquid electrolyte or a solid polymer electrolyte, the matrix being an organic fiber mat; and
(g) an oxygen containing liquid disposed in contact with the cathode and the cathode electrocatalyst, the oxygen containing liquid being of the type which is readily reoxygenated by contact with molecular oxygen.

25. A fuel cell comprising:
(a) an anode;
(b) a cathode;
(c) an anode electrocatalyst disposed in electrical contact with the anode, the electrocatalyst being capable of catalyzing hydrogen molecules to hydrogen ions;
(d) a cathode electrocatalyst disposed in electrical contact with the cathode, the cathode electrocatalyst being capable of catalyzing oxygen contained in an oxygen containing liquid to oxygen ions or hydroxyl ions;
(e) a fuel inlet port for introducing hydrogen to the hydrogen anode;
(f) an electrolyte electronically separating the anode from the cathode;
(g) an oxygen containing liquid disposed in contact with the cathode and the cathode electrocatalyst, the oxygen containing liquid being of the type which is readily reoxygenated by contact with molecular oxygen; and
(h) means for bubbling air through the oxygen containing liquid.

\* \* \* \* \*